March 9, 1937.　　　B. J. MERKLE　　　2,073,348
REDUCTION DRIVE
Filed July 3, 1933
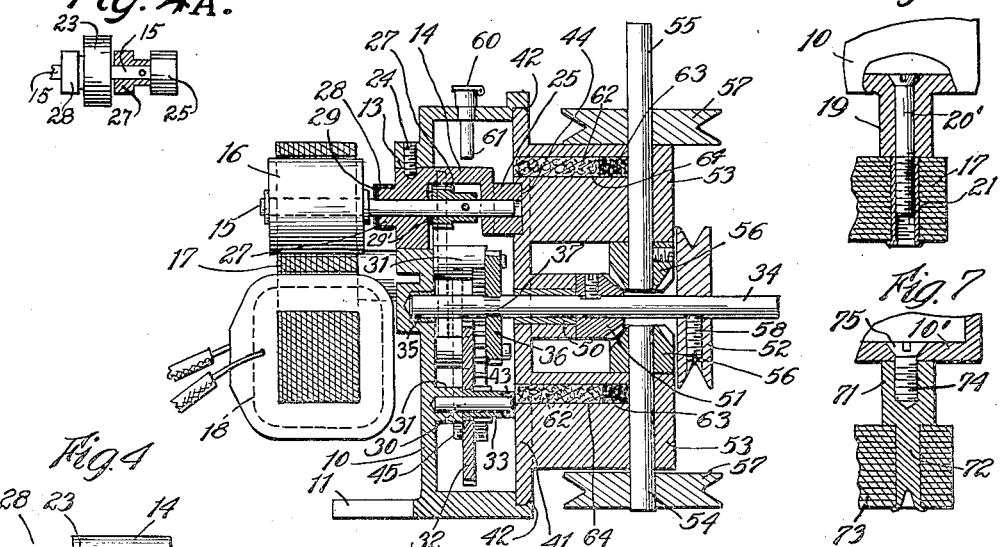
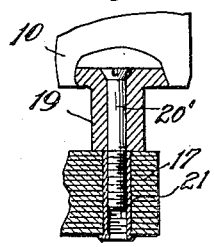
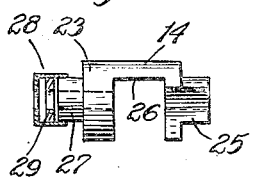
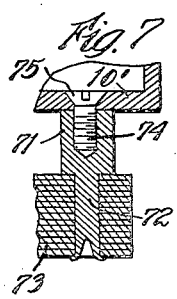
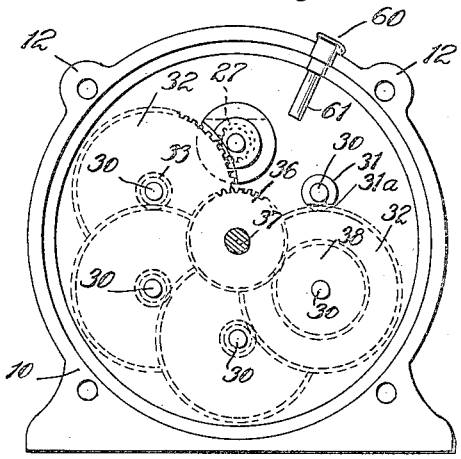
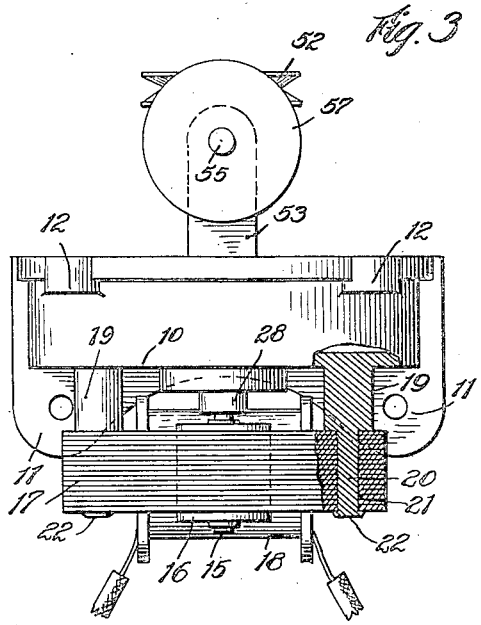
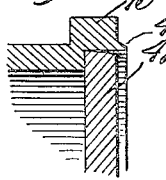
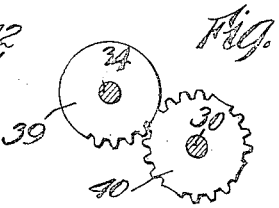
Inventor
Bernard J. Merkle
By Kent W. Wonnell Atty.

Patented Mar. 9, 1937

2,073,348

UNITED STATES PATENT OFFICE 2,073,348

REDUCTION DRIVE

Bernard J. Merkle, Chicago, Ill.

Application July 3, 1933, Serial No. 678,825

8 Claims. (Cl. 74—421)

This invention relates in general to a speed reduction gearing and an attached driving motor therefor and has more particular reference to a combined driving motor and reduction gearing having a common support and the bearing of the rotor being located in and receiving lubrication from the casing in which the reduction gears are mounted.

One of the principal objects of the invention is in the provision of a compact gear reduction motor drive in which the bearings for the motor are located at one side of the rotor itself and within the gear casing which provides a common support for the reduction gears and for the motor.

A further object of the invention is in the provision of a reduction gear holder in which the gear pinions are compactly arranged in a circular path and supported at graduated heights to provide a non-interfering mounting for gears of the same size.

Other objects of the invention are: to provide a reduction gear casing to which the driving motor is directly connected; to provide improved simple means for mounting pinions in a housing; to provide a succession of interengaging pinions at different elevations from one face of the housing; to provide improved means for attaching a driving gear to a supporting pinion; to provide a driving take-off which may be rotated at any angle about the outside of the gear casing; to seal the cover of the casing against unauthorized removal; to provide a plurality of drives in different directions simultaneously operated to simplify the construction and attachment of driving motor parts to a supporting casing; to provide an improved lubricating mounting for a motor; and in general to provide the construction herein shown and described.

In the accompanying drawing, Fig. 1 is a sectional view of a reduction drive illustrating the invention;

Fig. 2 is an elevation of the reduction gearing;

Fig. 3 is a top view showing the attaching portion in section;

Fig. 4 is an elevation of a motor bearing mounting;

Fig. 4A shows the motor shaft bearing in two spaced apart sections;

Fig. 5 illustrates a Geneva gearing for a stop motion drive;

Figs. 6 and 7 show modified motor and casing connections; and

Fig. 8 is a detail of the casing and plate before they are connected.

It is frequently desirable to rotate or actuate small advertising displays and drive mechanism of various kinds at low speed without requiring a great amount of power. Ordinary electric motors for such mechanism operate at such high speed that a reduction gearing is necessary to operate the mechanism at proper speed.

It is also desirable to provide a reduction gearing which is capable of great variation to produce different changes of speed and to deliver the selected speed of rotation at a variety of angles with the least possible trouble in producing such variations.

There is also a difficulty in properly lubricating the driving or rotary part of an electric motor and in suitably connecting and supporting it in engagement with the reduction drive members.

The present invention provides a connected driving motor, reduction gearing, and angular take-off, all in a unitary structure which is easily altered to change the speed and direction of drive with the motor speed constant, but when the selection is made the mechanism is free from tampering or alteration by unauthorized persons.

Referring now more particularly to the drawing, a gear casing or housing 10 has a base with perforated lugs 11 and perforated ears 12 for attaching it at right angles to the base. This casing is hollow and open at one side with a perforation 13 at the back for receiving a bearing 14 for a shaft 15 of an attached electric motor having a rotor 16, a laminated core 17 and a winding 18.

Extending from the back of the casing are projections 19 having reduced extremities 20 adapted to be inserted through registering perforations 21 in the laminations of the core 17 so that the core together with the winding thereon are quickly and easily attached to the casing. The projecting ends 22 of the reduced extremities 20 are upset or riveted over the core 17 holding it firmly in place.

The rotor 16 and shaft 15 of the motor are mounted upon the bearing 14 at one end of the motor shaft only, the bearing having an enlarged portion 23 which is seated in the hole 13 at the back of the casing and secured in place by any suitable means as by a set screw 24. This bearing has an extension 25 spaced from the portion 23 by a yoke 26 and a driving pinion 27 is mounted upon shaft 15 between the bearing portions 23 and 25 so that the movement of the rotor along its axis is limited by the engagement of the pinion 27 with the bearing portions 23 and 25.

At the outer end of the bearing 14 is a projection 27 for seating a resilient metal cap 28 adapted to be pressed thereon and to contain between them a fibrous washer 29 surrounding the shaft 15 for the purpose of preventing lubricant from exuding around the shaft but at the same time insuring that the shaft is thoroughly lubricated in the bearing portions 23 and 25 by the lubricant which it receives from the interior of the casing.

Within the casing 10 and extending upwardly in a ring about the center are a number of bearing posts 30 having supporting abutments 31 graduated in height and each adapted to receive a large gear 32 and a connected pinion 33, the posts 30 being spaced at such a distance apart that the large gear of one post engages the pinion of the preceding one. This arrangement requires that the connected gears and pinions be placed in succession one above the other upon the post 30, the first large gear 32 meshing with the pinion 27 carried by the motor shaft 15.

A driving or take-off power shaft 34 is mounted in a central bearing 35 in the side of the casing 10 and carries a gear 36 which is pressed upon a splined portion 37 of this shaft or otherwise suitably secured thereto, this gear meshing preferably with another gear 38 of the same size carried upon and attached to the last large gear 32 in the train of gearing for transmtting the power of the motor to the driving shaft 34.

Instead of the two driving gears 36 and 38, intermittent stop motion gears 39 and 40, as shown in Fig. 5, may be attached to the shaft 37 and to one of the posts 30 for causing an intermittent movement of the driving shaft 34.

In order to enclose the casing 10 and to suitably hold the driving gears in position, a cover plate 41 fits within the rim of the casing and abuts the ends of the posts 30. The plate is preferably held in place by rolling or otherwise turning inwardly the edge 42 of the casing flange over the outer edge of the plate 41 so that after once positioned the plate cannot be removed or shifted in position without disturbing the inwardly turned flange. In order to hold the gears and pinions closely in position on their respective posts 30, small shell washers 43 of various sizes are placed over the posts 30 between the outer ends of the gears 33 and the cover to fill the space on the post between them and the cover.

If desired, the outer bearing portion 25 of the bearing member 14 may be seated in a recess 44 in the cover 41 for providing an additional support for the shaft 15. If the connecting yoke 26 is omitted as shown in Fig. 4A, the two bearing parts 23 and 25 are separated and spaced apart by the driving pinion 27 between them.

The driving pinions 33 are preferably composed of metal and the gears 32 of fibre and a pair of them are attached together, the pinion having a splined extension 45 which is pressed through and secured to the gear. It will be understood that these sets of gears and pinions are interchangeable upon the different posts and may be assembled thereon in any number of sets to produce the desired gear reduction. In order to accommodate the gears compactly in the casing some or all of the abutments 31 may be provided with notches 31a permitting a large gear to be used and to extend as close to the adjacent post 30 as possible.

In the outer portion of the plate 41 is a central projection providing a bearing 50 for the driving shaft 34 and secured to the driving shaft is a bevel pinion 51 and if desired, a pulley 52. Also projecting outwardly from the plate are projections 53 on opposite sides of the shaft 34 adapted to provide bearings for transverse shafts 54 and 55, each having a bevel pinion 56 meshing with the bevel pinion 51 and a pulley 57 adjacent the outer end of the shaft. These pinions and pulleys are attached to the shafts by small set screws 58 or any other suitable means and in the case of the shafts 54 and 55 the pinions and pulleys thus attached position and hold the shafts in proper driving relation in the bearing projections 53.

With this construction and various combinations of the same and similar gears and pinions it is possible to obtain any desired speed variations within the limits of the mechanism by suitably combining and arranging the gears. It is also possible to obtain an intermittent or Geneva stop motion as described above. It is also found that there is no interference between gears and pinions as they are stepped and graduated in height with respect to each other; any angular take-off of the driving shaft 34 is possible by setting the cover plate 41 at the desired angle when it is flanged in place, the recess 44 being provided at the proper location therefor, or the bearing 25 being of sufficient length to abut the inner surface of the plate 41, as indicated by the broken line 25a in Fig. 1, if no recess 44 is provided; the driving unit when assembled cannot be reset, changed, or the driving arrangement renewed without destroying the flange connection of the cover plate.

Instead of the reduced projection 20 for holding the motor core 17 in place, a headed screw 20' (see Fig. 3) may be inserted from within the casing 10 through the projection 19 and threaded into the core 17. Another form is shown by Fig. 7 in which a projection 71 has a reduced stem 72 extendng through the stator laminations 73 and riveted over at the end. In the projection 71 is a threaded opening 74 into which a screw 75 is inserted from the inside of a casing 10'. Either of these constructions will prevent separation of the motor and the casing except by access through the casing.

A gearing of this kind is preferably run in oil and the contact of the fibre and metallic gears produces little wear and is practically noiseless. An oil cup 60 may be inserted through the casing with a tube 61 projecting inwardly so that even if the casing is tilted or upset not all of the oil in the casing will be spilled. This adapts the casing to be mounted with its base horizontal, or vertical, without losing lubricant. Tendency of the oil to exude along the motor shaft 15 is counteracted by the bearing 14, the felt washer 29, and a fibre oil throwing ring 29' which is positioned on shaft 15 between the bearing 14 and the casing 10.

Operation of the gears in the casing 10 causes the oil to be carried up by them, also lubricating the motor and driving shafts 15 and 34. Lubrication of the shafts 54 and 55 is effected through holes 64 extending from the inside of the cover plate 41 into the bearing projections 53 to the bores for the shafts 54 and 55. In these holes are absorbent oilers 62 and 63 of fibrous or wick-like material. The oiler 63 in contact with the shaft may be of softer or more resilient material while the outer oiler 62 is of harder material and holds the other one in, but both are for receiving lubrication from the interior of the casing and conveying it to the shafts.

To obtain any desired driven speed from the constant speed of the driving motor it is necessary only to assemble a certain set of gears which interengage between the driving and driven shafts and to attach the cover in place. To change or repair a driving gear arrangement after the removal of plate 41, it is necessary only to remove the shell washer 43 from the end of the bearing post 30 and lift the combined pinion and gear therefrom. The driving take-off can be connected directly to the shafts 34, 54 or 55 or to the pulleys mounted thereon in any desired combination and arrangement.

It is obvious that various other combinations of speeds, directions of rotating drives, and arrangements of the driving elements as related to different parts of the same or different devices may be made without departing from the spirit and scope of the invention.

I claim:

1. A gear reduction drive comprising a casing having a substantially flat wall with an outstanding continuous rim, a plurality of interengaging spur gears mounted within the casing, an electric motor having a stator suported externally on the said wall of the casing, a rotor within the stator having no connection with the stator, and a mounting for the rotor comprising a shaft extending within the casing at one side only of the stator, and a bearing mounted in the casing at the side of the rotor and having an extending yoke portion within the casing, a driving pinion mounted on the shaft within the yoke portion and engaging one of the gears within the casing for driving them.

2. In a self lubricating reduction gear drive, a casing with a substantially flat side wall and adapted to contain lubricant, gearing mounted therein, an electric motor having its stationary part fixed to the outside of the flat side wall of the casing, a rotor movable within the stator having a shaft extending through the side wall and into the casing, a bearing for the shaft supported by the said wall of the casing and having a spaced portion extending within the casing, a driving pinion on the shaft in the casing between the spaced portions of the bearing meshing with a gear of the gearing therein, the casing being adapted to be located in upright position so that some of the gears will engage a lubricant therein, and the lubricant being carried by the gears to the pinion and extending along the shaft to the bearing on both sides of the pinion.

3. In a driving gear, a casing, a train of gearing and means for mounting it in the casing, a removable cover for the casing, a shaft connected with the gearing and extending through the cover, a flange on the casing bendable to engage the cover at any angle about the shaft, and means forming an angular driving connection with the shaft having a fixed mounting on the outside of the cover, the cover being variable in position on the casing to change the angular position of the said connection, the position of the gearing within the casing remaining the same.

4. The combination with a casing adapted to be secured in fixed position, of a variable train of gearing and means for mounting it in the casing, a cover for the casing, the casing having a flange adapted to be bent over the edge of the cover for securing it in place, a drive shaft connected with the gearing and extending through the cover, and an angular driving connection connected to the shaft and supported by the cover, this driving connection being adjustable at any angle by rotating the cover and secured at such position by the flange and the location of the gearing in the casing being unchanged.

5. The combination with a casing having a perforated back and a flanged edge, a driving motor supported by the casing and means for securing it to the back from the inside of the casing through the perforations, variable gearing mounted in the casing and having a driving connection with the motor, a cover for the casing adapted to be engaged by the flange, a drive shaft in the cover, connected to the gearing, a driving attachment on the cover extending at an angle and connected to the shaft, the cover being rotatable to vary the angle of the attachment with respect to the shaft without varying the position of the gearing or the drive shaft in the casing, the cover being rotatably adjusted and held by the flange, and the motor attachment being inaccessible except when the cover is removed.

6. In a change speed gearing, a casing for containing lubricant having an upstanding flanged edge, a train of speed changing gearing therein, a driving motor supported on the casing externally thereof and comprising a stationary part and a movable rotary part extending within the casing and connected to the gearing, means extending from within the casing and into the stationary motor part for securing it on the outside of the casing, a cover for the casing fitting within the flange thereof, a driven shaft drivingly connected to the gearing within the casing and extending through the cover at an angle thereto, and the cover being held in place at any angle thereon by bending the flange of the casing against it.

7. In a reduction gear drive, a casing with a substantially flat inner wall, an electric driving motor and a power take off shaft, a plurality of bearings spaced about a common center therein having abutments integral with and projecting from the wall and graduated successively in height around the center, bearing posts projecting from the end of each of the abutments, a train of gears comprising a compound gear for each bearing post having a large and a small gear connected together and of a size that the small gear meshes with the large gear of the next adjacent post, and connections from the driving motor and power take-off shaft at the ends of said train of gears.

8. A reduction gear drive having a central shaft and a common casing support providing equally spaced bearings surrounding the shaft, the bearings comprising abutments graduated successively in height and having end posts fixed therein, interchangeable compound gears, one for each bearing, and each comprising large and small gears connected together and mounted upon adjacent posts against the abutments to produce a desired gear ratio, the large gear of each of the compound gears engaging with a small gear on the next bearing, means for driving the gearing train thus formed, and gearing means connecting the train with the said shaft.

BERNARD J. MERKLE.